Aug. 11, 1936. E. F. STOVER 2,050,674
INDICATING, RECORDING, AND INTEGRATING FLUID METER
Filed June 15, 1933
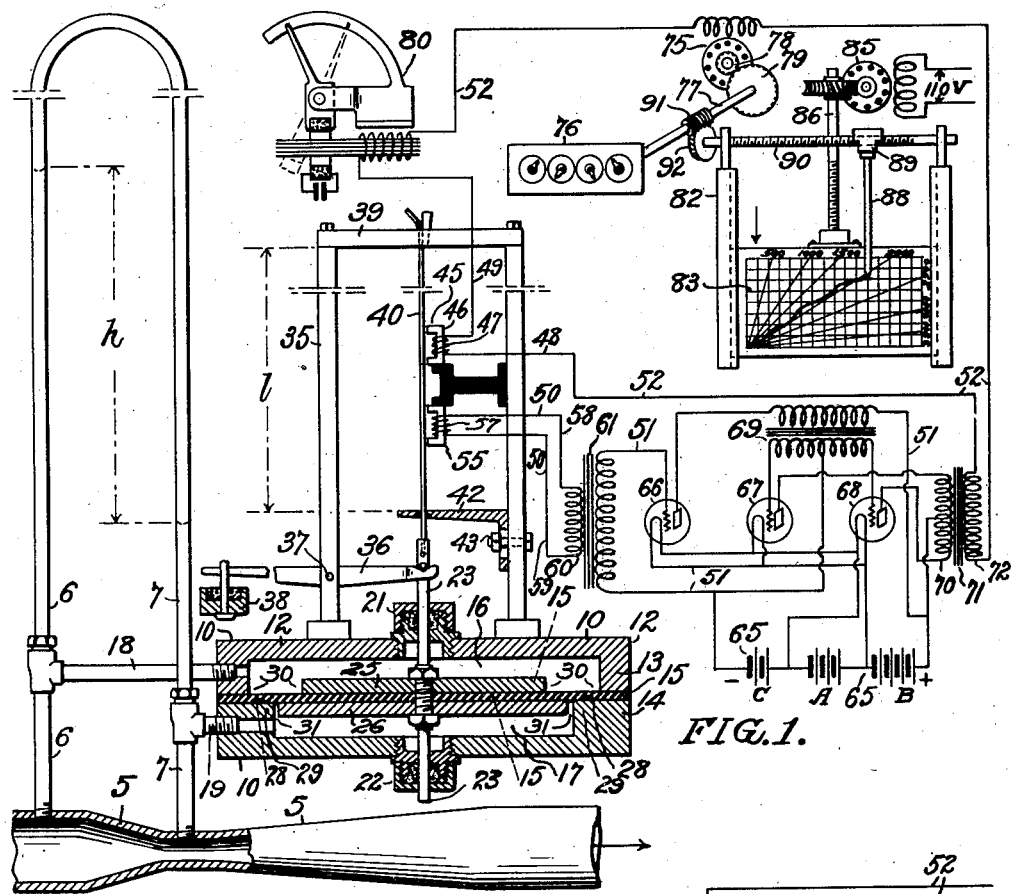
Inventor:
Emory Frank Stover
By F. DeWitt Goodwin
Attorney Patented Aug. 11, 1936

2,050,674

UNITED STATES PATENT OFFICE 2,050,674

INDICATING, RECORDING, AND INTEGRATING FLUID METER

Emory Frank Stover, Wynnewood, Pa.

Application June 15, 1933, Serial No. 675,907

12 Claims. (Cl. 73—206)

My invention relates to an indicating, recording, and integrating fluid meter, and particularly relates to improvements in a meter adapted for use in connection with systems employing Venturi tubes, orifices, flow nozzles and Pitot tubes, or any other primary metering device in which the rate of flow is proportional to the square root of the differential pressure across such device, and it is desired to obtain the rate of flow and the total flow through the primary metering device, or system.

The object of my invention is to provide a novel meter for directly showing the rate of flow through the primary device and also for showing the total flow, rate and total flow relatively to time, and for recording the various results.

A further object is to provide a meter having an elastic member which is caused to vibrate by any suitable means. Said member is placed under a tension proportional to the differential pressure produced in said primary device, whereby the tension upon said member will vary the number of vibrations of said member proportional to the square root of the tension.

A further object is to employ a novel pressure responsive device which is connected with said primary device so that the differential pressure, produced by said primary device, will act upon and move a diaphragm in said responsive device, and to operatively associate the diaphragm with the elastic vibrating member, for applying tension to said member, which tension is proportional to the differential pressure produced by said primary device.

My invention, in operation, employs the principle that the rate of flow through the primary device is proportional to the square root of the head, or differential pressure acting upon the diaphragm of the pressure responsive device, and the principle that the number of vibrations per second in the vibrating member is proportional to the square root of the tension applied to said member by the diaphragm.

A further object is to employ an electric circuit, including means for varying the alternations of the current in the circuit, which means are controlled and varied by the number of vibrations of the vibrating member.

A further object is to employ an electric circuit including any well known means for amplifying the current sufficiently to operate various devices included in said circuit.

A further object is to provide means actuated by the amplified current for maintaining the elastic member in a state of vibration, and arranged to permit the variable tension applied to said member to vary the frequency of said vibrations of the member, which in turn vary the frequency of the alternations in the current of the amplified circuit.

A further object is to employ, in a novel manner, various well known devices for indicating and counting the frequency of the vibrations of said elastic member, which devices are actuated by the frequency of the alternations of the current of the amplifier circuit.

These together with various other novel features of construction and arrangement of the parts which will be more fully hereinafter described and claimed constitute my invention.

Referring to the accompanying drawing:—

Fig. 1 is a diagrammatic view illustrating one embodiment of my invention, and showing the primary and responsive devices in vertical section.

Fig. 2 is a partial view, similar to Fig. 1, showing a different means for controlling the electric circuit by the vibrating member.

Fig. 3 is a horizontal section on line 3—3, Fig. 2.

Fig. 4 is a view similar to Fig. 2, showing a still different means for controlling the electric circuit by the vibrating member.

In the drawing in which like reference characters refer to like parts, 5 represents a Venturi tube or primary metering device, having pipes 6 and 7, connected therewith. The fluid is flowing through the device 5 in the direction indicated by the arrow and a differential pressure or head, indicated by the line $h$, is produced in the gage glasses forming part of the pipes 6 and 7, thus forming a primary metering device in which the rate of flow $q$ varies as the square root of the head $h$.

A pressure responsive device 10, comprises a casing 12 formed of sections 13 and 14, having a rubber diaphragh 15 secured between them, and forming pressure chambers 16 and 17. Said chambers are connected by pipes 18 and 19 with the pipes 6 and 7 from the tube 5, thus subjecting the diaphragm 15 to the differential pressure produced by the primary device 5, which differential pressure is proportional to the square of the rate of flow through the tube 5.

The casing 12 is provided with stuffing boxes 21 and 22 through which a piston rod 23 is freely movable. Said rod is secured to the diaphragm 15 and to the clamp plates 25 and 26.

The responsive device 10 is constructed in a novel manner for preventing the distortion of the rubber diaphragm 15.

The upper section 13 of the casing is formed with the chamber 16 having a greater diameter than the diameter of the chamber 17, formed in the lower section 14. The clamp plate 25, in chamber 16 is of smaller diameter than the clamp 26, in chamber 17. When the rubber diaphragm is subjected to high pressure in the chamber 16, it is supported upon the broad top facing surface 28 formed on the shoulder 29 and upon the larger clamp plate 26. This construction provides a large clearance space 30 on the upper or high pressure side of the diaphragm, and a small clearance space 31 on the lower side, for preventing the distortion of the material of the diaphragm. Heretofore in devices having equal clearance spaces above and below the diaphragm, the clamping action of the clamp plates would cause the rubber diaphragm to be distorted into a thick roll at the clearance space, which thick roll would tend to move the diaphragm due to the tendency of the rubber to return to its original shape and in doing so would cause the diaphragm to jump from its normal or central position. My improved construction insures that any motion which is applied to the diaphragm will be due to difference in pressure in the chambers above and below the diaphragm and not to any initial distortion and stress in the rubber diaphragm at the clearance space.

A frame 35 is mounted upon the casing 12, or in fixed relation thereto. A lever 36 is pivoted upon a pin 37 mounted on the frame. Said lever is pivotally connected at one end with the rod 23 and its other end is provided with an adjustable weight 38, for counterbalancing the weight of the diaphragm and piston rod, and for compensating for the shape of the co-efficient curve of the primary device.

An elastic vibrating string, or member 40, which in the present disclosure is in the form of a metallic wire, is attached to the rod 23 and to the top cross-piece 39 of the frame 35.

A bridge 42 is adjustably secured to the frame 35 by a fastening device 43. The member 40 is drawn over the bridge and is restrained by the latter against lateral motion at this point. The free length l of the member 40 is defined by the position of the bridge 42 relatively to the length of the member. The bridge permits the tension upon the member to be varied by the action of the diaphragm 15. By this arrangement the tension upon the member will be varied directly as the differential pressure, or head, which acts upon the diaphragm, and the total pull on the wire or member 40, will be proportional to the differential pressure times the area of the diaphragm.

The member 40 is caused to vibrate, by any suitable means. In disclosure shown in Fig. 1, an electromagnet 45 is provided. The magnet consists of a core 46 with its poles located in spaced relation to the metallic wire, or member 40. A coil 47 embraces the core 46, and is connected in a circuit including conductors 48 and 49, carrying an alternating current, as will be more fully hereinafter described. By this means the member 40 is continuously vibrated.

The number of vibrations, $n$, per second of the member 40 varies as the square root of the tension, $T$, applied to said member by the diaphragm 15. Therefore the number of vibrations $n$ is directly proportional to the rate of flow $q$.

The principle of operation is as follows: In the primary device 5, the rate of flow, $q$, varies as the square root of the head $h$. $K$ represents a constant.

$$q \propto \sqrt{h} \text{ or } q = K\sqrt{h} \quad \text{(Equation 1)}$$

The law of the vibrating string is:—$n$, the number of vibrations per second of member 40, varies as the square root of, $T$, the tension applied to the member 40 by the diaphragm 15.

$$n \propto \sqrt{T} \text{ or } n = K_1\sqrt{T} \quad \text{(Equation 2)}$$

When the diaphragm 15 is subjected to the differential pressure $h$, a total pull $T$ is produced on the string, or member 40, which is equal to the differential pressure times the area of the diaphragm. Thus $$T \propto h \text{ or } \sqrt{T} \propto \sqrt{h} \text{ or } \sqrt{T} = K_2\sqrt{h} \quad \text{(Equation 3)}$$

The above equations show that the vibration rate of the member 40 is equal, or proportional, to the rate of flow through the primary device 5, since $$n = K_1 K_2 \sqrt{h}$$

and if $$K = K_1 K_2 \quad n = q$$

An electric circuit is actuated, or controlled, by the vibrations of the member 40. Said circuit includes an input circuit 50, an amplifying circuit 51 and an output circuit 52, all of which circuits may be similar to the well known types now in general use in the radio art.

The input circuit 50 includes a permanent magnet 55, having its poles located adjacent to the vibrating metallic member 40, so the vibrations of the member will vary the air gap between the poles. The magnet 55 is provided with an inductive winding, or coil 57 connected by the conductors 58 and 59 with the primary winding 60 of a transformer 61.

The amplifying circuit 51 includes the secondary winding of the transformer 60. The amplifying circuit also includes the usual power supply 65, vacuum tubes 66, 67 and 68, transformer 69, and the primary winding 70 of a transformer 71. The output circuit 52 includes the secondary winding 72 of the transformer 71 and transmits power for operating the various devices hereinafter more fully described.

The frequency of the vibrations of the member 40 is varied by the tension applied to said member by the differential pressure acting upon the diaphragm of the responsive device 10, and the frequency of the vibrations of said member is therefore proportional to the rate of flow, or discharge, through the primary device.

The vibratory motion of said member varies the air gap of the magnet 55 and produces a flux in the magnetic input circuit 50, which generates an alternating potential in the amplifier circuit 51 which in turn receives power from the power supply 65 and delivers to the output circuit an amplified current at a frequency corresponding to the frequency of the vibrating member 40.

The output circuit 52 is utilized to operate the driver, comprising the magnet 45, which acts upon the member 40 and imparts energy to the latter, to maintain the vibrations and overcome the air friction, the frequency of which vibrations of said member, being varied by the tension applied by the pressure responsive device 10.

The amplifying circuit becomes a regenerative circuit with a mechanical feed back in the form of the vibrating member controlling the frequency of the output current.

A synchronous motor 75 is included in the output circuit 52. As the frequency of the ouput current is proportional to the rate of flow through the primary device 5, the motor 75 will run at a speed proportional to the rate of flow through said device. An integrating device 76, which may be of any well known type is operated by a shaft 77, which is driven through suitable gears 78 and 79 by the motor 75. Said integrating device 76 will give the integrated total flow through the primary device.

A frequency indicator 80, which may be of any standard type, is included in the output circuit 52, for indicating the frequency of the current in the output circuit, and the rate of flow $q$.

A novel recording device 82 is provided for recording upon a chart, the total discharge, through the primary device, for a total period of time, or for a fraction of the total time, and also for recording a curve from which may be determined the rate of flow at any instant of time.

The recording device 82 comprises a chart 83, which is moved, in the direction of the arrow, at a constant rate by a motor 85 which rotates a threaded shaft 86, which latter is operatively associated with the chart for moving the same.

A pen 88, or other suitable device, is arranged for tracing a curve upon the chart 83. The pen is mounted upon a split nut 89, which is engaged by a threaded shaft 90 for moving the pen along the shaft 90 and over the chart in a direction at right angles to the movement of the chart. The shaft 90 is rotated by means of gears 91 and 92 operated by the shaft 77, which is rotated by the motor 75.

The motor 75 is operated at a speed corresponding to the frequency of the amplified current, which frequency is proportional to the rate of flow through the primary device 5, therefore the pen is moved relatively to the chart, in a direction parallel with the length of the shaft 90, at a rate dependent upon the frequency of the amplified current and proportional to the rate of flow through the primary device. As the chart moves downwardly in the direction indicated by the arrow and the pen is moved from left to right over the chart, a curve will be traced upon the chart recording the total discharge through the primary device 5. The horizontal lines upon the chart represent divisions of time and the vertical lines represent divisions of the total discharge.

The average rate of flow on the chart over a given time may be ascertained by dividing the total discharge by the time.

The rate of flow or discharge, at any instant of time may be ascertained by the radial lines which are provided upon the chart and numbered 500, 1000, 1500 and so on. The radial lines are inclined and numbered to correspond to different rates of flow. If any part of the curve, at a given time of the day, is parallel to one of the radial lines, the number on that line will indicate the rate of flow at that instant. This may be readily done with a parallel ruler, which may be placed parallel with the particular part of the curve, and then associated with a radial line which is parallel with said particular part of the curve, and the number on that radial line will indicate the rate of flow, or discharge, at that instant, through the primary device 5.

Heretofore recording devices have been made with a chart which is moved at a constant speed and provided with a pen which is moved over the chart a distance corresponding to the rate of flow. Such charts show the rate of flow at any given time, but they do not show the total flow or total discharge except by the use of a planimeter, or other device for obtaining the area under the curve.

My device records the total flow, as the pen is advanced at a rate proportional to the rate of flow through the primary device, and a total distance proportional to the total flow through the primary device.

Figures 2 and 3 illustrate a form of my improved meter, in which the vibrating metallic member 40a is electrically connected to form part of the input circuit 50. A strong permanent or electromagnet 94 is mounted upon the frame so that the member 40a will vibrate between the poles of the magnet, whereby an alternating current of a frequency equal to the frequency of the vibration of the member 40a, will produce corresponding alternations in the input circuit 50, which current is amplified and utilized as above described.

Figure 4 shows a vibrating member 40b having secured thereon a concentrated mass 96, which is free to vibrate between the poles of the driver magnet 45b and the poles of the pickup magnet 55b which magnets are connected in the circuits 52 and 50, respectively, shown in Fig. 1.

The mass 96 causes the member 40b to vibrate at lower frequencies for a given tension thus producing corresponding frequencies or alternations in the input circuit 50 above described.

In the form shown in Fig. 4 the poles of the magnets 45b and 55b must be arranged, as indicated, to avoid direct magnetic feed back which would cause the amplifying circuit to oscillate at a frequency dependent upon the electrical constants of the circuit and independently of the motion of the vibrating member.

The operation of my invention is as follows:— When a certain differential pressure acts upon the diaphragm 15 a tension is applied to the vibrating member, or string 40, which tension controls the frequency of the vibrations of the string at a rate directly proportional to the rate of flow through the primary device 5. The frequency of the vibrations of the string 40 varies the alternations in the current of an electric circuit which includes means for amplifying the current sufficiently to operate a feed back circuit arranged for maintaining the string in a state of vibration. When the frequency of the alternations in the current of the input circuit is varied by changes of the tension upon the string, the frequency of the current in the feed back circuit will also be varied, and the frequency of the vibrations of the string and alternations in the current will remain constant as long as the flow through the primary device 5 remains constant.

I claim:

1. In a meter for measuring the flow of fluid in a conduit, the combination of, a differential pressure producing device mounted in said conduit, a pressure responsive device having a member movable by the differential pressure produced by said first named device, an elongated flexible tensioned vibrating member operatively associated with the movable member of said responsive device whereby force is applied to the vibrating member for varying the tension proportional to said differential pressure and for varying the frequency of the vibrations of said vibrating member proportional to the square root of the tension and proportional to the rate of flow through the conduit, means for imparting and maintaining vibratory motion in said vibrating member, and an adjustable counterbalance operatively associated with the movable member of said responsive device for compensating for the shape of the co-efficient curve of said differential pressure producing device.

2. In a meter the combination of a pressure responsive device having a member movable by varying pressure, an elongated flexible tensioned vibrating member operatively associated with the first named member whereby force is applied to said vibrating member for varying the tension proportional to the pressure applied to said device, the frequency of vibration of said member being proportional to the square root of the tension, means for imparting and maintaining free vibratory motion in said vibrating member the frequency of which vibratory motion is varied by variations in the tension applied to the vibrating member, an electric circuit, said means for imparting vibratory motion to the vibrating member being included in said circuit, means included in said circuit and operatively associated with and actuated by the frequency of the vibrations of the vibrating member and arranged for varying the frequency of the alternations of the current in said circuit proportional to the square root of the pressure applied to said movable member.

3. A meter for measuring the flow of fluid in a conduit comprising, a differential pressure producing device mounted in said conduit, a pressure responsive device connected with said pressure producing device, an elongated flexible tensioned member operatively associated with said responsive device whereby force is applied to said member, an electric circuit, means included in said circuit for producing vibratory motion in said member, means included in said circuit and controlled by the frequency of the vibrations of the flexible member for controlling the frequency of the alternations in the current of said circuit, and a frequency responsive device included in said circuit.

4. In a meter, the combination, of a pressure responsive device, including a movable member actuated by varying pressure, an elongated flexible tensioned vibrating member operatively associated with the movable member of said responsive device whereby force is applied to said vibrating member, an amplifying electric circuit, means included in said circuit for producing vibratory motion in said vibrating member, and means included in said circuit and controlled by the frequency of the vibrations of the vibrating member for controlling the frequency of the alternations in the current of said circuit.

5. A meter for measuring the flow of fluid in a conduit comprising a differential pressure producing device mounted in said conduit in which the flow is proportional to the square root of the differential pressure, a pressure responsive device connected with said pressure producing device, an elongated flexible tensioned member, means for producing vibratory motion in said member, said member operatively associated with said responsive device whereby force is applied to said member proportional to the differential pressure applied to said responsive device and arranged for varying the frequency of the vibrations in said member proportional to the square root of the tension in said vibrating member in accordance with the natural law of a vibrating string whereby the frequency of vibration of said member is proportional to the square root of the tension and of the differential pressure in said responsive device and proportional to the rate of flow in said conduit, an electric circuit, means included in said circuit and controlled by the frequency of the vibrations of said member for controlling the frequency of the alternations in the current of said circuit, means included in said circuit for producing vibratory motion in said vibrating member, and a frequency responsive device included in said circuit.

6. A meter for measuring the flow of fluid in a conduit comprising, a differential pressure producing device mounted in said conduit in which the flow is proportional to the square root of the differential pressure, a pressure responsive device connected with said pressure producing device, said pressure responsive device including a movable member actuated by the differential pressure produced by the first named device and a piston rod operatively associated with said movable member, an elongated flexible tensioned vibrating member operatively associated with said rod whereby force is applied to the vibrating member, an electric circuit, means included in said circuit and controlled by the frequency of the vibrations of the vibrating member for controlling the frequency of the alternations in the current of said circuit, means included in said circuit for amplifying said current, and means included in said circuit for producing vibratory motion in said vibrating member.

7. A meter for measuring the flow of fluid in a conduit comprising, a differential pressure producing device mounted in said conduit in which the flow is proportional to the square root of the differential pressure, a pressure responsive device connected with said pressure producing device, said pressure responsive device including a movable member actuated by the differential pressure produced by the first named device and a piston rod operatively associated with said movable member, an elongated flexible tensioned vibrating member operatively associated with said rod whereby force is applied to the vibrating member, an electric circuit, means included in said circuit and controlled by the frequency of the vibrations of the vibrating member for controlling the frequency of the alternations in the current of said circuit, means included in said circuit for amplifying said current, a lever pivotally associated with said rod, an adjustable weight upon said lever for compensating for the weight of the rod and the movable member and for the shape of the co-efficient curve of said differential pressure producing device, and means included in said circuit for producing vibratory motion in the vibrating member.

8. In a meter the combination of a pressure responsive device having a member movable by varying pressure and a rod movable with said movable member, a metallic string attached to said rod whereby tension is applied to the string proportional to the varying pressure upon the movable member, an electric circuit, means included in said circuit and operatively associated with the string whereby the vibration of the string will vary the alternations in the current of said circuit, and electrical means in said circuit and operatively associated with the string for producing vibratory motion in the latter.

9. In a meter the combination of a pressure responsive device having a member movable by varying pressure and a rod movable with said movable member, a metallic string attached to said rod whereby force is applied to the string proportional to the varying pressure upon the movable member, an electric circuit, an electromagnet included in said circuit and operatively associated with the string whereby the vibrations of the string will vary the alternations in the current of said circuit, and electrical means operatively associated with the string for producing vibratory motion in the latter.

10. In a meter the combination of a pressure responsive device having a member movable by varying pressure and a rod movable with said movable member, a metallic string attached to said rod whereby force is applied to the string proportional to the varying pressure upon the movable member, an electric circuit including said string, electrical means operatively associated with the string for producing vibratory motion in the latter, and a magnet in said circuit and located adjacent to the string and arranged for varying the alternations in the current of said circuit proportional to the frequency of the vibrations of the string.

11. In a meter the combination of a pressure responsive device having a member movable by varying pressure, a string operatively associated with the movable member whereby force is applied to the string proportional to the varying pressure upon the movable member, a concentrated metallic mass mounted upon the medial portion of the string, an electric circuit, an electro-magnet included in said circuit, said magnet located adjacent to said mass whereby the vibrations of the string and said mass will vary the air gap of the magnet and cause alternations of the current in the circuit, a second electromagnet included in said circuit, and said second magnet located adjacent to said mass and arranged for maintaining the mass in a state of vibration.

12. In a meter the combination of a pressure responsive device having a member movable by varying pressure and a rod movable with said member, a frame, a vibrating string having one end secured in said frame and its opposite end secured to said rod, a bridge secured upon said frame and engaging said string for determining the free length of the string, an electric circuit, means included in said circuit and operatively associated with the string and actuated by the frequency of the vibrations of the string and arranged for varying the alternations of the current in the circuit, and means operatively associated with the string for maintaining the string in a state of vibration.

EMORY FRANK STOVER.